UNITED STATES PATENT OFFICE.

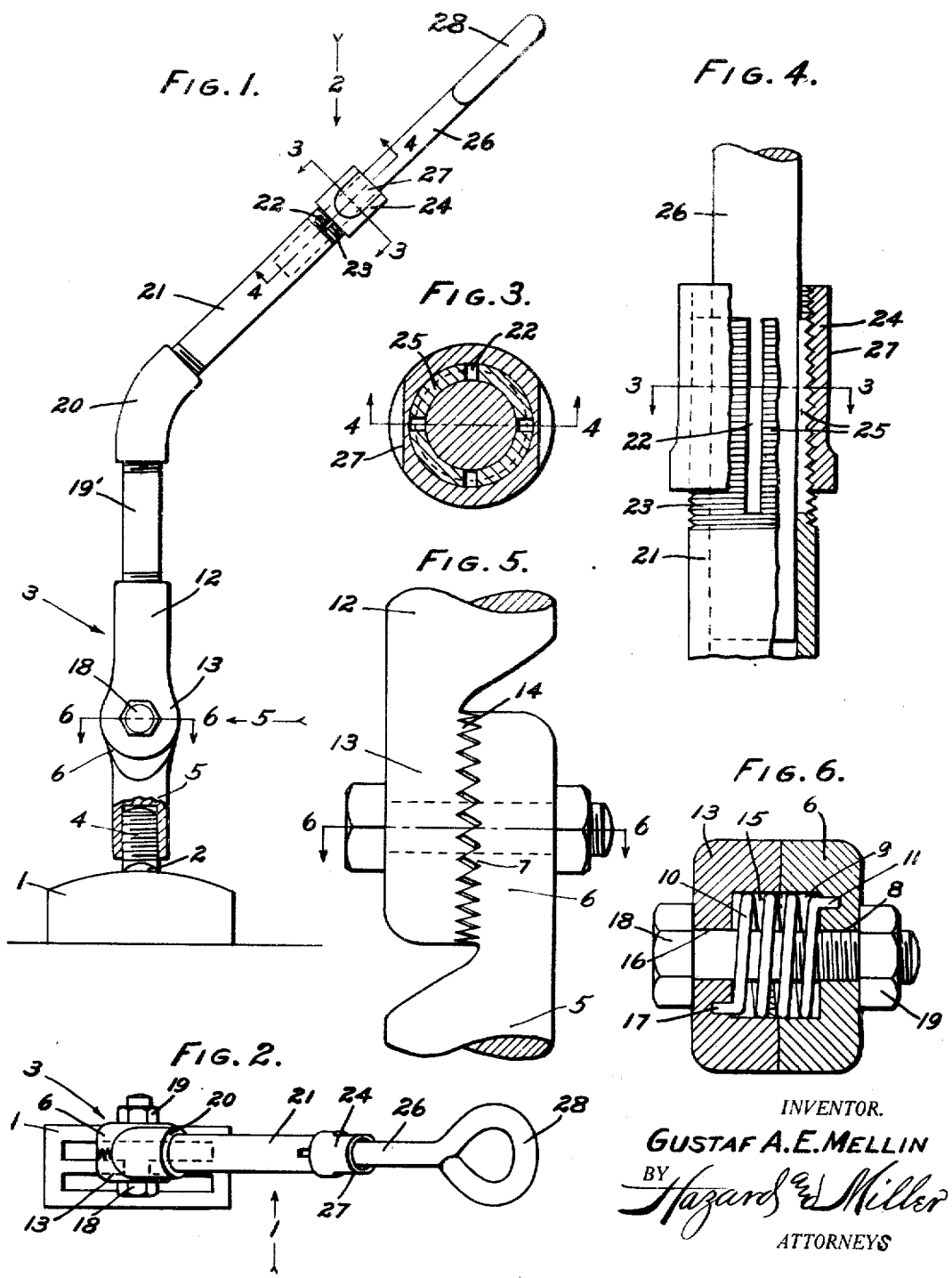

GUSTAF A. E. MELLIN, OF LOS ANGELES, CALIFORNIA.

ADJUSTABLE GEAR-SHIFT LEVER FOR AUTOMOBILES AND THE LIKE.

1,301,475.  Specification of Letters Patent.  Patented Apr. 22, 1919.

Application filed September 11, 1918. Serial No. 253,613.

*To all whom it may concern:*

Be it known that I, GUSTAF A. E. MELLIN, a citizen of the United States, residing at Los Angeles, in the county of Los Angeles and State of California, have invented new and useful Improvements in Adjustable Gear-Shift Levers for Automobiles and the like, of which the following is a specification.

My object is to make an improved adjustable gear shift lever for motor vehicles, and my invention consists of the novel features herein shown, described and claimed.

Figure 1 is a side elevation of an adjustable gear shift lever for motor vehicles embodying the principles of my invention, parts being broken away and shown in section, and the view being taken looking in the direction indicated by the arrow 1 in Fig. 2.

Fig. 2 is a top plan view looking in the direction indicated by the arrow 2 in Fig. 1.

Fig. 3 is an enlarged cross section on the lines 3—3 of Figs. 1 and 4.

Fig. 4 is an enlarged fragmentary longitudinal sectional detail on the lines 4—4 of Figs. 1 and 3.

Fig. 5 is an enlarged fragmentary edge view as seen looking in the direction indicated by the arrow 5 in Fig. 1.

Fig. 6 is an enlarged cross sectional detail on the lines 6—6 of Figs. 1 and 5.

The sector 1 may be of any of the ordinary constructions and the stem 2 extending from above the sector 1 downwardly through the sector to the operating parts of the shift gear may be of any of the ordinary constructions. My present invention relates to the adjustable handle portion 3 which combines with the stem 2 to make my adjustable gear shift lever. The upper end of the stem 2 has an external screw thread 4 and the internally screw threaded socket 5 is screwed down upon the thread 4. The clamping jaw 6 extends upwardly from the socket 5 and has a flat corrugated side face 7 in a plane parallel with the central longitudinal axis of the socket 5. The corrugated side face 7 is circular in side elevation and a tapped bolt hole 8 is formed through the jaw 6 at the axial center of the face 7, and a spring seat 9 is formed in the corrugated side face concentric to the bolt hole 8. A torsion and expansion spring 10 is mounted in the spring seat 9 and has a bent end 11 extending into a small opening at the bottom of the spring seat to hold the spring from rotating.

The internally screw threaded socket 12 has a clamping jaw 13 provided with a corrugated side face 14 fitting the corrugated side face 7. A spring seat 15 is formed at the axial center of the corrugated side face 14, and a smooth bolt hole 16 extends from the spring seat 15 through the jaw 13. The spring 10 has a bent end 17 extending into a small opening from the spring seat 15 to hold the spring from rotating. The bolt 18 is inserted through the bolt hole 16, through the spring 10 and screwed through the opening 8, and a jam nut 19 is mounted upon the end of the bolt against the outer face of the jaw 6. The spring 10 is placed in the seats 9 and 15 under torsional tension, so that the force of the spring tends to rotate the jaw 13 relative to the jaw 6, and the bolt 18 is adjusted to bring the teeth of the corrugated side face 7 into engagement with the teeth of the corrugated side face 14 more or less tightly as desired, so as to allow lost motion between the teeth. The spring 10 will hold the teeth tight one way and leverage to overcome the spring 10 will move the teeth the other way to a more or less limited extent as desired.

A pipe nipple 19' is screwed into the socket 12. A 45° elbow 20 is screwed upon the upper end of the nipple 19, and a pipe nipple 21 is screwed into the upper end of the elbow 20. The upper end of the pipe nipple 21 has a series of longitudinal slots 22 extending from the end face of the nipple past the screw threads 23, and a sleeve 24 is screwed upon the thread 23, the screw threaded portion of the nipple being tapered, so that the fingers 25 between the slots 22 will yield under the action of the sleeve 24 to form a clutch. The extension rod 26 is slidingly mounted in the pipe nipple 21 and fits loosely or slidably when the sleeve 24 is unscrewed, so that when the rod is moved in or out to the desired extent the sleeve 24 may be tightened to grip the rod and hold it in its adjusted position. Wrench seats 27 are formed upon the sleeve 24, so that the sleeve may be operated with a wrench or spanner. The outer end of the rod 26 is bent to form a ring shaped handle 28, and the handle 28 is adjustable to lengthen or shorten the leverage by manipulating the clutch, and the plane of the ring 28 is adjustable by loosening the clutch and rotating the rod 26 in the nipple 21. The position of the handle 28 may be adjusted by rotating the elbow upon the nipple 19 or the nipple 21 in the socket 12, or by omitting the elbow 20 and nipple 19 and screwing the nipple 21 into the socket 12.

The use of pipe nipples and a comparatively small rod 26 provides more or less elasticity in the handle, and the lost motion between the jaws 6 and 13 provides further elasticity to allow the handle to give when the gear is shifted or attempted to be shifted with the mating gear out of mesh. A circular handle like the ring 28 is preferable to a ball handle because it requires less space, is cheaper to make, and easier to grasp firmly by the hand. The 45° elbow 20 divides the strain between the two pipe nipples 19 and 21, increases the range of adjustment and offsets the handle relative to the lower portion of the lever to give more leg room for the operator.

If the adjustable gear shift lever is to be manufactured with the motor vehicle, the joint formed by the thread 4 and socket 5 will be omitted and the stem 2 will be formed integral with the jaw 6, but where it is desired to apply the principles of my invention to a motor vehicle already constructed I simply cut off the upper part of the stem, make the screw thread 4 and apply my handle, as shown and described.

Various changes may be made without departing from the spirit of my invention as claimed.

I claim:

1. In an adjustable gear shift lever a stem; a clamping jaw rigid with the stem and having a flat corrugated side face in a plane parallel with the axis of the stem, and having a spring seat extending from the corrugated face and a bolt hole extending from the spring seat; a torsion and expansion spring mounted in the spring seat and held against rotation; a second clamping jaw having a corrugated side face fitting the corrugated side face of the first jaw, and having a second spring seat extending from the corrugated face and a bolt hole extending from the second spring seat, the other end of the spring being mounted in the second spring seat under tension and held against rotation, and a bolt inserted through the bolt holes for adjustably compressing the spring to bring the teeth of one corrugated face into motion more or less with the teeth of the other corrugated face to provide lost motion between the two clamping jaws.

2. In an adjustable gear shift lever a stem; a corrugated clamping jaw rigid with the stem, the corrugated face being parallel with the axis of the stem; a second clamping jaw engaging the first clamping jaw; an expansion and torsion spring between the clamping jaws; and an adjustable pivot bolt connecting the clamping jaws, so as to provide more or less lost motion between the clamping jaws.

3. In an adjustable gear shift lever a stem; a corrugated clamping jaw rigid with the stem with its face parallel with the axis of the stem; a second corrugated clamping jaw fitting the first corrugated clamping jaw; a bolt connecting the jaws; a socket extending from the second clamping jaw; a pipe nipple extending from the socket; a 45° elbow upon the pipe nipple extending from the elbow; means forming a clutch upon the upper end of the second pipe nipple; a rod extending through the clutch; and a ring handle upon the upper end of the rod.

In testimony whereof I have signed my name to this specification.

GUSTAF A. E. MELLIN.